US012670136B1

(12) United States Patent
Martinez et al.

(10) Patent No.: US 12,670,136 B1
(45) Date of Patent: Jun. 30, 2026

(54) AI-ENHANCED FIELD DATA COLLECTION, VALIDATION, AND WORKFLOW MANAGEMENT SYSTEM

(71) Applicant: Atser Inc., Houston, TX (US)

(72) Inventors: David Frederick Martinez, Houston, TX (US); Apurba Rimal, Houston, TX (US); Joseph Fernandez, Houston, TX (US)

(73) Assignee: Atser Inc., Houston, TX (US)

( * ) Notice: Subject to any disclaimer, the term of this patent is extended or adjusted under 35 U.S.C. 154(b) by 0 days.

(21) Appl. No.: 19/186,585

(22) Filed: Apr. 22, 2025

Related U.S. Application Data

(63) Continuation-in-part of application No. 19/072,776, filed on Mar. 6, 2025.

(51) Int. Cl.
| | |
|---|---|
| *G06F 16/20* | (2019.01) |
| *G06F 16/215* | (2019.01) |
| *G06Q 10/0633* | (2023.01) |
| *G10L 15/22* | (2006.01) |
| *G06V 10/82* | (2022.01) |
| *G06V 30/148* | (2022.01) |

(52) U.S. Cl.
CPC ....... *G06F 16/215* (2019.01); *G06Q 10/0633* (2013.01); *G10L 15/22* (2013.01); *G06V 10/82* (2022.01); *G06V 30/153* (2022.01); *G10L 2015/223* (2013.01)

(58) Field of Classification Search
CPC .................................................. G06F 16/215
See application file for complete search history.

(56) References Cited

U.S. PATENT DOCUMENTS

| | | | | |
|---|---|---|---|---|
| 11,237,563 | B2 * | 2/2022 | Javault | A01D 46/30 |
| 11,733,978 | B2 * | 8/2023 | Straub | G06N 20/00 |
| | | | | 717/104 |
| 2008/0263465 | A1 * | 10/2008 | Fox | G06F 16/29 |
| | | | | 715/764 |

OTHER PUBLICATIONS

Anonymous, "Revolutionizing Field Data Collection with Conversational AI: Your Personal Assistant in the Field" Apr. 20, 2024 [ retrieved May 1, 2026]. Retrieved from the Internet: https://web. archive.org/web/20240420141221/https://zerionsoftware.com/digital-transformation/revolutionizing-field-data-col (Year: 2024).*

* cited by examiner

*Primary Examiner* — Kristopher Andersen
(74) *Attorney, Agent, or Firm* — PatentPC; Bao Tran

(57) ABSTRACT

A method for capturing and processing field data in construction materials testing and inspection workflows uses a field AI Field Assistant to integrate data from various sources, such as testing machines, photographs, and AI-generated outputs. The method first collects field sample test data, which is then scrubbed with an AI module to remove anomalies and normalize formats. Human voice input is used to verify a portion of the scrubbed data, creating a validated data set that feeds into the field AI Field Assistant. The Field Assistant guides users through work order and test selections, dynamically generates data entry prompts, and captures voice-driven data that is converted to text. The system securely records and stores this information, maintains an audit trail with timestamps and user identification, and synchronizes data with a central web application. Additional functionalities include voice-based user authentication, image recognition or OCR for processing photographs, and adaptive data prompts customized to each client or project's requirements.

21 Claims, 9 Drawing Sheets

Storing the validated data set
in a database accessible by
authorized users or systems (S200)

Associating metadata with the validated data
set indicating source type and confirmation
details, wherein metadata includes timestamps
indicating when each step of collection,
scrubbing, and confirmation occurred (S202)

START

END

START

Adapting the dynamically generated
data entry prompts based on specific
requirements of clients and projects (S700)

Generating a user interface that displays
the list of work orders, available
tests, and populated data fields (S702)

END

AI-ENHANCED FIELD DATA COLLECTION, VALIDATION, AND WORKFLOW MANAGEMENT SYSTEM

BACKGROUND OF THE INVENTION

The construction industry has long relied on traditional methods for recording, managing, and validating data during materials testing and inspections. Historically, field data capture has involved largely manual, paper-based, or isolated digital processes, which can lead to inefficiencies, transcription errors, and delays in communication between onsite personnel and offsite project managers. As construction projects become increasingly complex and demand higher levels of precision in quality assurance, there has been a steady evolution toward more integrated, automated systems that combine digital data acquisition with streamlined workflow management. Advances in mobile technology, wireless connectivity, and voice recognition have contributed to a growing interest in methods designed to enhance the accuracy and timeliness of field data capture while facilitating real-time collaboration and decision support in construction materials testing and inspection processes.

SUMMARY OF THE INVENTION

In one aspect, the method collects a field sample test from a testing machine, a photograph, or an artificial intelligence generated output. In one aspect, the method scrubs the collected field data using an AI scrubbing module and confirms a selection of the AI-scrubbed data via human voice input to generate a validated data set. In one aspect, the validated data set is provided to a field AI Field Assistant that prompts users to complete data entry tasks related to sample tests and daily reports. In one aspect, the method dynamically guides a technician or inspector through specified steps including job date selection, work order confirmation, test configurations, and report sections. In one aspect, the method records and stores user-provided data securely, enabling immediate or deferred synchronization with a central web application.

In yet another aspect, a method is provided for managing construction materials testing and inspection workflows using a field AI Field Assistant. In yet another aspect, a field sample test is collected from sources such as a testing machine, a photograph, or an AI-generated output. In yet another aspect, the collected field data is scrubbed by an AI module and then validated through human voice input to create a validated data set. In yet another aspect, this validated data set is supplied to the field AI Field Assistant, which prompts a user to complete data entry tasks related to sample tests and daily reports. In yet another aspect, the method includes authenticating the user based on voice input. In yet another aspect, the user is prompted to select a date for which job information is viewed, with a corresponding list of work orders presented for that date. In yet another aspect, a work order is selected by the user, followed by a prompt to choose a test to perform, with dynamically generated data entry prompts based on the selection. In yet another aspect, the method receives voice responses to these prompts, converts them into text data, and populates corresponding data fields. In yet another aspect, the populated data fields are displayed for the user's confirmation, and upon receiving a sync command, the data is synchronized with a central database.

Advantages of one implementation may include one or more of the following:

Enhanced Accuracy in Data Capture: By integrating an AI scrubbing module with human voice confirmation, the method reduces transcription errors and ensures that only validated data is processed. This results in higher quality data acquisition compared to traditional manual or paper-based methods.

Improved Field Efficiency: The field AI Field Assistant dynamically guides technicians through critical steps (e.g., job date selection, work order confirmation, and test configurations), streamlining the data entry process and reducing overall on-site data collection time.

Real-Time Collaboration and Decision Support: Immediate or deferred synchronization with a central web application allows for real-time data sharing between onsite personnel and offsite project managers, facilitating timely decision-making and better project oversight.

Reduced Manual Intervention: Automation of data scrubbing and conversion of voice inputs to text minimizes the need for manual data entry, lowering the risks associated with human error and labor-intensive processes.

Enhanced Workflow Consistency: The system provides dynamic prompts based on test selection and report sections, ensuring that field technicians follow standard procedures consistently across diverse projects and testing scenarios.

Improved Data Security and Authentication: User authentication via voice input, coupled with secure storage of user-provided data, enhances the security of sensitive construction information, reducing the risk of unauthorized access or data tampering.

Integration with Modern Mobile technologies: Utilization of wireless connectivity and mobile technology facilitates seamless on-site operations, ensuring that construction materials testing and inspection workflows are technologically current and adaptable to evolving industry requirements.

Scalability and Adaptability: One implementation's design enables integration with various data sources (testing machines, photographs, AI-generated outputs) and interaction modalities, making it versatile for different construction projects and materials testing techniques while evolving with future technological advancements.

These advantages collectively contribute to higher precision in quality assurance, streamlined inspection workflows, and real-time updates, all of which are critical to the increasingly complex demands of modern construction projects.

DETAILED DESCRIPTION OF THE INVENTION

Figure 1:
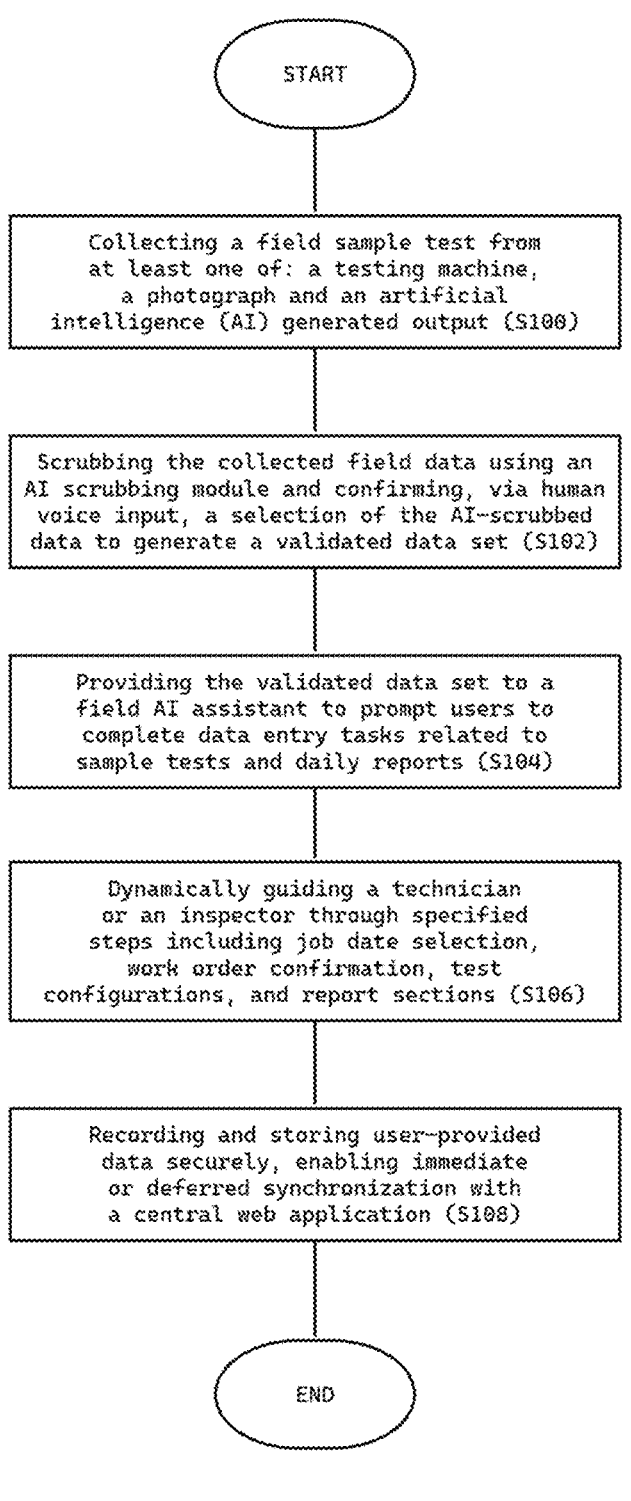
FIG. 1 shows flowchart illustrating an AI-enhanced system for field data collection, validation, and workflow management.

One implementation discloses a method for collecting a field sample test, wherein the sample test is obtained from at least one of a testing machine, a photograph, or an artificial intelligence (AI) generated output as contemplated by reference label S100. In one embodiment, the method involves obtaining a field sample test directly from a testing machine that performs measurements on construction materials, thereby allowing for immediate acquisition of test parameters. In an alternative embodiment, the field sample test is derived from a photograph that captures a visual representation of the test setup or outcomes. In another embodiment, the field sample test is generated by an AI system that produces algorithmic outputs representing test results. By accommodating multiple sources, the method ensures versatile and efficient data capture techniques suitable for varying field conditions and testing environments.

One implementation includes a step, designated S102, in which field data from one or more sources is processed by an AI scrubbing module that reviews and filters the raw input. This module automatically examines the collected data to remove inaccuracies, extraneous details, or errors based on predefined criteria. Following this automated process, a subset of the scrubbed data is presented for human confirmation via voice input. This voice confirmation validates the data, ensuring that the information subsequently employed in the system is reliable and relevant. The resulting validated data set is created through an integration of automated processing and user verification, thereby ensuring a standard of quality before it is used in further operations or stored for future reference.

One implementation provides a mechanism wherein a validated data set is supplied to a field AI Field Assistant. In this embodiment, once the field data has been scrubbed using an AI module and confirmed via human voice input, the resulting validated data set is delivered to the field AI Field Assistant (S104). The field AI Field Assistant then utilizes this data set to prompt users to complete associated data entry tasks related to sample tests and daily reports. This process ensures that the data entry prompts are both contextually relevant and dynamically generated based on the prior validation of the collected field data.

In one embodiment, a field AI Field Assistant dynamically guides a technician or inspector through several sequential steps to facilitate efficient and accurate completion of tasks. The system initiates the process by prompting the user to select the job date, offering a clear and concise interface that displays the available dates for which work orders are scheduled. Once a date is selected, the Field Assistant presents a corresponding list of work orders for that day, allowing the technician or inspector to confirm the specific work order associated with their field assignment.

After confirming the work order, the field AI Field Assistant helps with test configurations by dynamically generating prompts based on the type of work order and the test being executed. The user is then guided through various report sections that require data entry, ensuring that every essential element—from test setup details to final report content—is addressed. This dynamic guiding feature, as shown in reference label S106, streamlines the workflow and minimizes the likelihood of errors by adapting the sequence of prompts to the specific requirements of each task.

The disclosed one implementation provides a system in which user-provided data is recorded and stored in a secure manner, ensuring that the information remains confidential until it is synchronized with a central web application. In operation, data received from the user—whether entered manually, via voice, or through other input modalities—is captured and saved in an encrypted format within a secure storage area. The system is configured to support both immediate synchronization with a central web application when a secure network connection is available, and deferred synchronization when connectivity is limited or temporarily unavailable. This dual-mode approach allows field operators to continue working under various network conditions while still ensuring that all collected data is eventually transmitted to a centralized database for further processing and analysis. The method of recording and storing user-provided data securely, enabling immediate or deferred synchronization with a central web application, is hereinafter referred to as S108.

Figure 2:
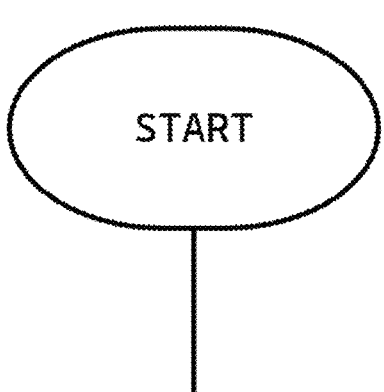
FIG. 2 shows flowchart showing a process with steps for storing validated data and associating metadata with timestamps.
Figure 2:
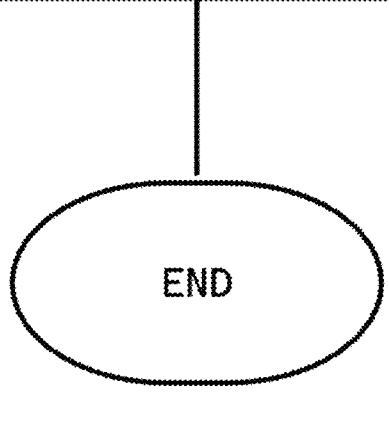

FIG. 2 illustrates a flowchart depicting a process that includes steps for storing validated data and attaching metadata with timestamps.

The process involves storing a validated data set in a database that is accessible to authorized users or systems. This step ensures that the structured and confirmed information is securely kept within a centralized location, facilitating efficient data management and retrieval by users who have the necessary permissions.

The reference label "associating metadata with the validated data set indicating source type and confirmation details, wherein metadata includes timestamps indicating when each step of collection, scrubbing, and confirmation occurred" corresponds to process step S202. In this step, the validated data set is enhanced by associating metadata that specifies the type of source from which the data was collected and details regarding its confirmation. This metadata includes timestamps that record the exact times at which each phase of data collection, data scrubbing, and confirmation was performed, thus providing a comprehensive audit trail for the data processing workflow.

Figure 3:
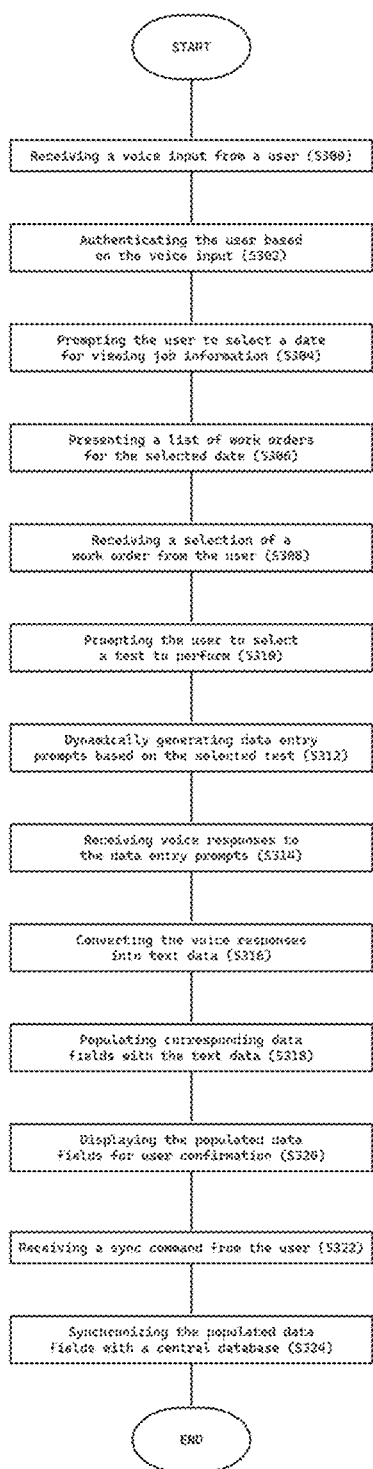
FIG. 3 shows flowchart illustrating a process for AI-enhanced field data collection, validation, and workflow management.

FIG. 3 illustrates the process for AI-enhanced field data collection, validation, and workflow management. It includes steps such as receiving voice input, authenticating the user, presenting work orders, and dynamically generating data entry prompts. The process continues with converting voice responses into text data, populating data fields, and synchronizing with a central database.

In the process depicted in FIG. 3, a key initial step involves receiving a voice input from a user as indicated by reference label S300. This step is essential for engaging users and facilitating subsequent interactions with the system. The voice input serves as the preliminary communication method for initiating various workflow tasks and ensures user authentication for secure operations.

In step S302, the process validates a user by utilizing the received voice input. This voice authentication verifies that only authorized individuals can access and interact with the system, thereby safeguarding the integrity and security of the data management workflow. The procedure confirms the identity of the user before any further interactions or data entries related to construction materials testing and inspection tasks occur.

The process begins by prompting the user to select a date for viewing job information. This involves presenting options to the user through a user interface, allowing them to specify a particular day. The selected date becomes the reference point for subsequent steps, such as retrieving and displaying relevant job details associated with that day.

The reference label "S306" refers to the step in the process where a list of work orders is presented to the user for the selected date. This is part of an AI-enhanced method for managing workflows, where after selecting a date, the user is shown a relevant compilation of work orders. This aids in organizing tasks effectively, allowing the user to choose specific work orders that need attention or action.

In the process flow, at step S308, the system involves obtaining a user's choice of a work order. This selection is based on the list of work orders that the system presented to the user for a specific date. The user's interaction ensures that the subsequent tasks and tests are associated with the correct work order.

Step S310 involves prompting the user to select a specific test to perform. This step occurs after the user has selected a work order, allowing for a tailored approach to data entry. By focusing on individual test selection, the system can dynamically adapt subsequent prompts, ensuring that the data captured is relevant and precise for the specific testing scenario.

The process involves dynamically generating data entry prompts based on the selected test (S312). This allows for customized guidance to users in entering relevant data accurately. The prompts are adapted to the specific details of the chosen test, ensuring that all necessary information is collected systematically and efficiently. This dynamic adjustment helps streamline the workflow and enhances data accuracy by providing targeted instructions tailored to the specific testing requirements.

The process involves receiving voice responses from the user to the data entry prompts. This step ensures that the input is collected interactively, allowing for seamless capture of the necessary information related to the selected test. The user's spoken responses serve to accurately populate the subsequent data fields.

The method comprises transcribing the received voice responses into text data. This process ensures that the information provided by the user through voice input is captured in a written format, thereby enabling subsequent processing and interaction within the workflow management framework. Converting voice to text plays a vital role in preserving data accuracy and consistency, which allows for seamless integration of user responses into the broader system.

In the context of the described method, "populating corresponding data fields with the text data" (S318) involves taking the text data resulting from the conversion of voice responses and placing it into appropriate data fields within the system. This step ensures that the information gathered through voice input is accurately and systematically organized, allowing for subsequent confirmation by the user and synchronization with the central database.

The process involves displaying populated data fields to the user after converting voice responses into text. This allows the user to review and confirm the accuracy of the entered information before proceeding. This step helps ensure that any discrepancies can be addressed, thereby improving data reliability and maintaining data integrity within the workflow system.

The process includes a step where the system receives a synchronization command from the user. This command initiates the synchronization of populated data fields with a central database, ensuring that any data entered and confirmed by the user is securely updated and stored within the centralized system. This action allows for immediate or scheduled updates, facilitating data consistency across platforms.

The flowchart illustrates the process culminating in the step "synchronizing the populated data fields with a central database," designated as S324. At this stage, after collecting, validating, and confirming data entries, the information is synchronized with a central database. This ensures that all validated data entries are securely integrated into the primary system for access and use by authorized personnel or systems. Such synchronization facilitates real-time data availability and accuracy across involved platforms, enabling efficient management and decision-making processes.

Figure 4:
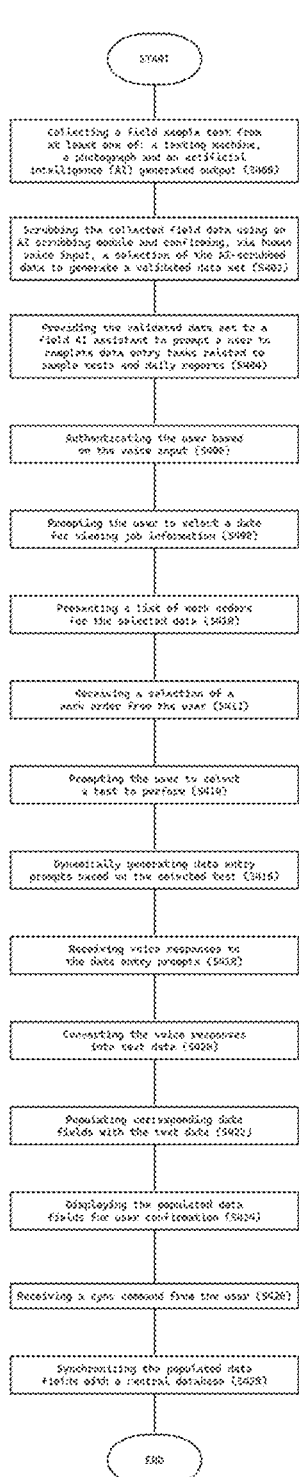
FIG. 4 shows flowchart depicting an AI-enhanced field data collection, validation, and workflow management system from start to end with various steps including data collection, validation, user authentication, and synchronization.

FIG. 4 illustrates a comprehensive flowchart detailing an AI-enhanced system for field data collection and management. It covers the journey from data acquisition through validation, user authentication, and synchronization with a central database.

The method begins with the collection of a field sample test from available sources, which include a testing machine, a photograph, and an artificial intelligence generated output. This initial step initiates the data collection process, ensuring that diverse sources are utilized for comprehensive data acquisition. This approach allows for versatile data input, accommodating various formats and origins, to enhance the robustness of the subsequent analysis. The collection mechanism effectively integrates multiple sources to gather essential field data for further processing.

The step labeled "presenting a list of work orders for the selected date (S410)" involves displaying a comprehensive list of work orders that correspond to the date chosen by the user. This facilitates the user's ability to identify and select from relevant tasks scheduled for the specified date, aiding in the efficient management of their workflow and ensuring all necessary work orders are visible and accounted for.

In the described method, the reference label "prompting the user to select a test to perform (S414)" involves a step where the user is guided by the system to choose a specific test to conduct. This prompt occurs after the selection of a work order, ensuring that the user can identify and select the appropriate test relevant to their tasks. The system's interface facilitates this process, making it intuitive for users to proceed with their testing activities.

In the described system, converting the voice responses into text data corresponds to reference label S420 in the process flow. After receiving voice responses from the user regarding data entry prompts, the system processes these audio inputs to transform them into textual information. This conversion enables the system to populate associated data fields with accurate and transcribable text, ensuring seamless integration into subsequent steps such as user confirmation and database synchronization.

The step of "displaying the populated data fields for user confirmation" (S424) involves presenting the processed and filled data entries to the user for verification. This allows the user to review the information captured and transcribed by the system, ensuring that all details are accurate and correctly represented before proceeding with further actions or synchronization with a central database. This step helps maintain precision in the data recorded, enabling users to confirm or make corrections as necessary.

The stage labeled "receiving a sync command from the user" (S426) involves capturing an instruction from the user to initiate the synchronization process. This step indicates that the user has reviewed the data and is ready for it to be integrated into the central database system. The sync command ensures data accuracy by confirming the user's readiness to proceed with updating the main records.

Figure 5:
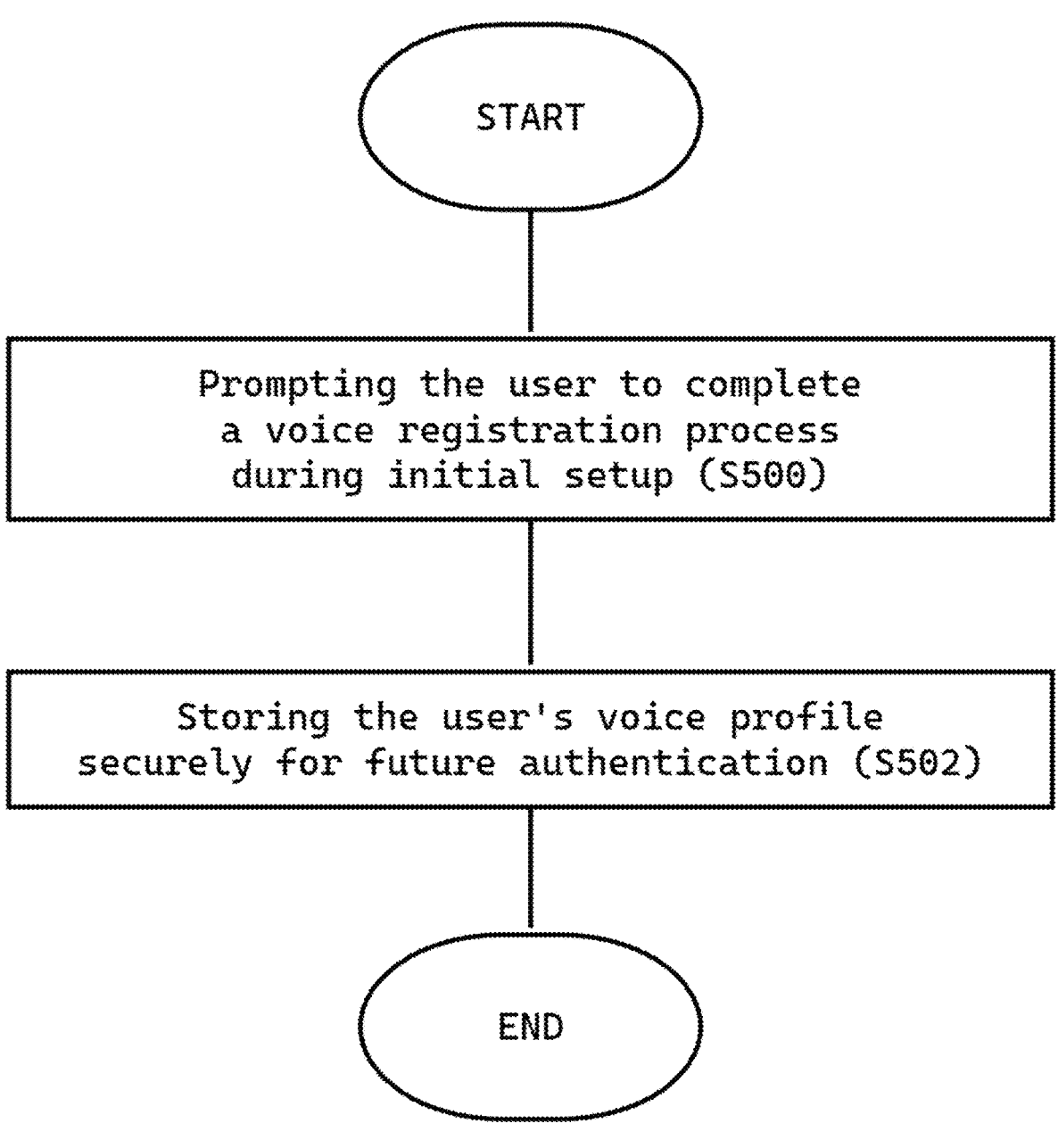
FIG. 5 shows flowchart depicting steps for voice registration and secure storage for user authentication.

FIG. 5 illustrates the steps for voice registration and secure storage for user authentication, beginning with prompting the user to complete a voice registration process during the initial setup and followed by securely storing the user's voice profile for future authentication.

Figure 6:
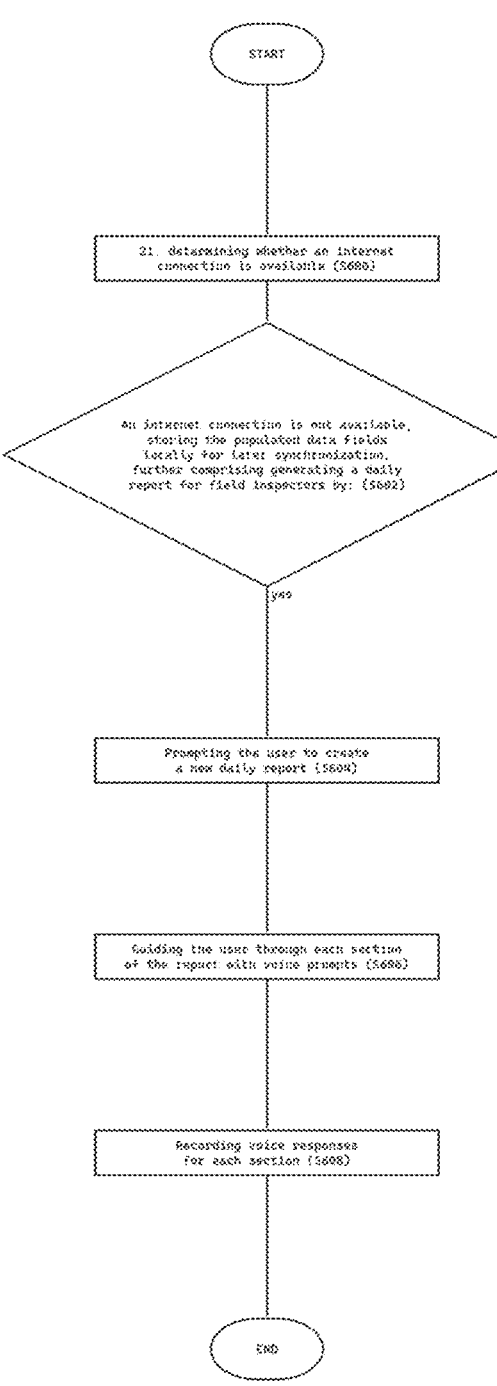
FIG. 6 shows flowchart depicting a process of determining internet connectivity and guiding users through report creation with voice prompts.

FIG. 6 illustrates the process of determining internet connectivity and guiding users through report creation with voice prompts. The flowchart starts with checking for an internet connection. If unavailable, the data is stored locally for later synchronization, and a daily report is generated for field inspectors. The user is then prompted to create a new report and guided through each section with voice prompts, lastly recording voice responses for every section.

The process begins with determining whether an internet connection is available (S600). If connectivity is present, the system can perform synchronization immediately. However, if an internet connection is unavailable, the populated data fields are stored locally for future synchronization once connectivity is restored.

In the method, if an internet connection is not available, the process involves storing the populated data fields locally for later synchronization. This approach ensures that data is not lost and can be synchronized with a central database once connectivity is restored. Additionally, during this offline period, a daily report for field inspectors is generated, allowing them to continue with their reporting tasks without interruption.

The process involves prompting the user to initiate the creation of a new daily report. This step is essential for organizing and recording data related to daily activities. The user is guided through this initiation phase, ensuring that all necessary information is captured systematically for subsequent documentation and analysis.

In step S606, the method involves guiding the user through each section of a report using voice prompts. This process ensures that users receive clear and consistent instructions for completing each part of the report. By utilizing voice prompts, the system provides real-time guidance, enhancing the ease and accuracy of data entry. This approach also supports hands-free operation, allowing users to focus on other tasks while completing the report, thereby improving workflow efficiency.

Figure 7:
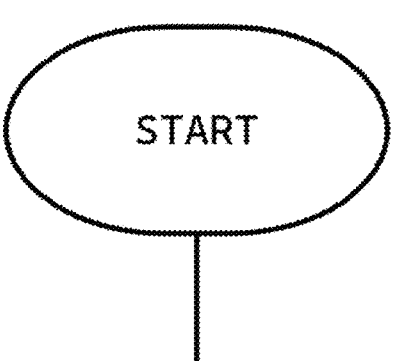
FIG. 7 shows flowchart with steps for adapting data entry prompts and generating a user interface.
Figure 7:
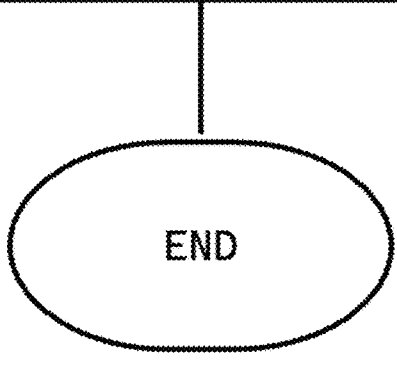

FIG. 7 illustrates the flowchart for adapting data entry prompts and generating a user interface. It includes steps such as adapting the dynamically generated data entry prompts based on specific client and project requirements, and generating a user interface that displays work orders, available tests, and populated data fields.

The method involves adapting data entry prompts according to specific requirements of clients and projects. This ensures that the prompts are relevant and tailored to the unique needs and specifications of each client or project, enhancing the effectiveness and accuracy of data collection.

The reference label "S702" pertains to the step of generating a user interface that displays a list of work orders, available tests, and data fields that have been populated. This step ensures that users can easily view and manage relevant information in a structured format, facilitating efficient interaction with the system.

In an embodiment wherein collecting the field sample test comprises directly receiving sensor measurements from the testing machine, the system is configured to interface with one or more sensors embedded within the testing machine to acquire accurate and real-time data. The testing machine converts physical sensor inputs into digital signals and transmits these sensor measurements directly to the system without requiring intermediary manual data entry or post-capture processing. The direct receipt of sensor measurements enhances data integrity by mitigating potential errors associated with manual input or indirect data acquisition methods, and the digital format facilitates immediate processing by the AI scrubbing module. The AI scrubbing module processes the raw sensor measurements to remove noise and anomalies, thereby generating a refined and validated data set. This validated data set is then provided to the field AI Field Assistant for prompting users to complete data entry tasks related to sample tests and daily reports. In certain embodiments, the system further associates metadata with the validated data set, wherein the metadata includes timestamps and other source-identifying information corresponding to when the sensor measurements were received and processed.

In one embodiment, the system collects raw data by extracting image-based information directly from a photograph. In this embodiment, collecting a field sample test (S100, S400) involves, when a photograph is used to capture the field sample, employing an image processing module configured to extract pertinent visual information directly from the photograph. This extraction involves identifying and isolating regions within the photograph that contain relevant data such as test readings, numerical displays, or other visual indicators of performance. The extraction process further includes techniques such as optical character recognition, edge detection, and feature extraction algorithms to convert the image-based information into data used for further processing. Once the raw data is extracted directly from the photograph, the system passes the image-based data to an AI scrubbing module (S102, S402) which processes and cleanses the information. The AI scrubbing module filters out noise and irrelevant details, thereby ensuring that only the validated information is used in subsequent steps. The resulting validated data set, now including the extracted image-based information, is then provided to a field AI Field Assistant (S104, S404) to prompt the user to complete data entry tasks related to sample tests and daily reports. The validated data, along with associated metadata comprising timestamps, extraction parameters, and image quality data, is subsequently stored (S200, S202) and used to ensure that further processing and synchronization steps (S108, S324, S428) reflect the accurate and comprehensive capture of the field sample test data.

In one embodiment, collecting raw data involves directly receiving a data output generated entirely by an artificial intelligence (AI) model without human intervention. In this configuration, the AI model is specifically trained on historical datasets that are relevant to the validated data set being generated. The historical datasets include prior field test results, environmental conditions, and metadata from previous sample tests, thereby enabling the AI model to generate output that reflects the anticipated characteristics of new field sample tests. Once the AI model produces the data output, the system directly receives this output as raw data for further processing. The raw data collected in this manner is subsequently subjected to an AI scrubbing process, wherein the data is cleansed and specific portions are selected for validation via human voice input. The incorporation of the AI model trained on historical datasets not only improves the accuracy and relevancy of the data generated but also reduces the reliance on manual data collection methods. This approach provides a rapid and efficient means of acquiring raw data that is intrinsically aligned with the expected validated data set, thereby streamlining subsequent processes such as data verification, dynamic prompt generation, voice authentication, and synchronization with remote databases. The seamless integration of AI-generated data into the overall data collection system enhances the robustness of field data management and maximizes operational efficiency.

Scrubbing the collected raw data involves removing anomalies or outliers identified by the AI scrubbing module and applying machine learning algorithms trained on historical anomaly patterns. In one embodiment, the AI scrubbing module examines raw data collected from field sample tests (e.g., S100, S400) and identifies data points exhibiting deviations from established norms determined from historical data. The module deploys machine learning algorithms trained on historical anomaly patterns to detect these deviations, classifying portions of the data as potential anomalies or outliers. Once identified, the system removes these outliers from the dataset or otherwise modifies the raw data to reduce their impact. The removal process eliminates data points falling outside predetermined threshold limits based on learned historical parameters and incorporates user confirmation through voice input when necessary. By employing these machine learning techniques, the system enhances the accuracy of the cleaned data, thereby forming a more reliable input into subsequent stages, such as providing validated data to the field AI Field Assistant (e.g., S104, S404) and supporting further dynamic prompting and synchronization processes.

The system further comprises a database that securely stores the validated data set and grants access to authorized users or systems through appropriate authentication procedures. In certain embodiments, the database is integrated with backend systems, allowing remote retrieval and analysis of the validated data set when required. In addition, the system associates metadata with the validated data set that indicates the source type of the collected data and incorporates confirmation details from the validation process. The metadata includes timestamps that record the precise moments at which each key step-namely, collection of the field sample, scrubbing by the artificial intelligence module, and subsequent human voice confirmation of a portion of the AI-scrubbed data-occurred. By maintaining such time-stamped information, the system ensures a comprehensive audit trail that reinforces data integrity and traceability throughout the process. The association of detailed metadata with the validated data set not only enhances the accuracy of data management but also provides authorized users with the necessary contextual information to assess the provenance and reliability of the field sample test data.

In one embodiment, the field AI Field Assistant further comprises the step of capturing a user's voice during an initial setup process to ensure that only authorized personnel can interact with the system. During this process, the system prompts the user to complete a voice registration procedure, wherein the user's voice is captured by a microphone and analyzed to extract unique biometric features. The captured voice data is then processed to create a secure voice profile that is stored in association with the user's identity. This stored voice profile is later utilized to authenticate the user during subsequent interactions with the field AI Field Assistant, thereby preventing unauthorized access. By incorporating this voice registration process into the initial setup, the system ensures that all future communications and transactions are carried out by verified users, thus maintaining the integrity and security of the field data collection and reporting processes.

In one embodiment, the step of work order selection involves prompting the user to input a date for which work orders are to be reviewed. The system retrieves and displays available work orders corresponding to the specified date. The system employs a user interface element to visually present a list of work orders associated with the entered date, and this list is formatted for easy selection. Once the available work orders are presented, the system accepts user inputs to select the relevant work order number. The system captures the user-provided selection and highlights or marks the corresponding work order for further processing in subsequent steps. This enhanced work order selection method ensures that a user-defined date correlates effectively with the available work orders, ultimately improving the accuracy and efficiency of work order identification and processing in the field data collection system.

In one embodiment, the system includes field data entry prompts that guide a user through the specific fields required for test configuration by recording user responses directly into correlated entries. The system is configured to dynamically generate these prompts based on the selected test, ensuring that each required input field is identified and that the responses provided by the user are directly associated with the corresponding test parameters. Upon selection of a particular test from the available options, the field data entry prompts are generated such that each prompt corresponds to a predetermined configuration field. The voice responses received from the user are converted into text data, which is then automatically populated into the associated entries with the test configuration. This process enhances accurate data capture and minimizes the likelihood of errors by ensuring that each data field is linked directly to and validated against its corresponding test parameter. The dynamically generated prompts and the direct recording of user responses into the correlated entries improve the overall efficiency of the system by streamlining data entry during field operations while accurately recording all test-specific configuration details for subsequent synchronization and analysis.

To facilitate secure access and efficient data entry, the system utilizes a voice-controlled interface. In this regard, the user undergoes a voice registration process during initial setup (S500, S502) to create a secure voice profile for subsequent authentication. When a user interacts with the system, the voice input is received (S300) and used to authenticate the user (S302, S406). After authentication, the system prompts the user to select a date for viewing job information (S304, S408) and displays a list of work orders corresponding to the selected date (S306, S410). Once the user selects a work order (S308, S412) and a test to perform (S310, S414), the system dynamically generates contextual data entry prompts (S312, S416). The user's voice responses to these prompts are received (S314, S418), converted into text (S316, S420), and used to populate corresponding data fields (S318, S422). For user convenience, the populated data fields are displayed on an interface for confirmation (S320, S424) before the user issues a sync command (S322, S426) to synchronize the data with a central database (S324, S428).

In scenarios where an internet connection is not available (S600), the system is configured to store the populated data fields locally and later synchronize the data when connectivity is restored (S602). Furthermore, the system supports the creation of daily reports for field inspectors. In one embodiment, daily report creation allows a user to start a new report via voice command, with the system automatically navigating the user to a pre-configured report section within the application. This facilitates rapid report initiation and guidance through the report process, including prompting the user to create a new daily report (S604) and guiding the user through each section of the report with contextual voice prompts (S606). The system then records voice responses for each section (S608), ensuring that the report data is captured accurately and efficiently.

In additional embodiments, the system adapts the dynamically generated data entry prompts to meet the specific requirements of different clients and projects (S700) and generates a user interface that displays not only the list of work orders and available tests but also the populated data fields (S702). These features collectively contribute to enhanced field data collection and processing capabilities, ensuring that both data integrity and user interaction are maintained efficiently in diverse operational environments.

A method for managing construction materials testing and inspection workflows using a field AI Field Assistant comprises collecting a field sample test from at least one source selected from a testing machine, a photograph, or an artificial intelligence generated output. In some embodiments, the field sample test is obtained directly from sensors or devices associated with each source, thereby capturing data relevant to construction material integrity. The collected field data is then scrubbed using an AI scrubbing module that applies automated algorithms to remove noise, inconsistencies, or irrelevant information. During the scrubbing process, the system is configured to prompt for human voice input so that a user can confirm a selection from the AI-scrubbed data, thereby generating a validated data set that ensures only accurate and approved data is used. Once the validated data set is generated, it is provided to a field AI Field Assistant that prompts the user to complete additional data entry tasks related to both the sample tests and daily reports. These prompts are tailored to the specifics of the testing and inspection work, ensuring that the necessary details are captured in a clear and precise manner.

In one embodiment, after the populated data fields are displayed for user confirmation (S320, S424), the system further comprises providing an option to edit the populated data fields by voice command. In this embodiment, a voice command input module is configured to detect an edit command from the user, which triggers an editing mode allowing modifications to the already populated data fields. Once the edit command is received, the system prompts the user by voice to specify the data field to be corrected, followed by a new voice input that identifies the desired replacement or addition to the existing data. The system then converts the voice input into text data (S316, S420) and updates the corresponding data fields accordingly. The updated fields are subsequently re-displayed on the user interface (S320, S424) for further user verification. Following the editing operation, if the user provides a sync command (S322, S426), the updated data fields are synchronized with a central database (S324, S428) or stored locally if an internet connection is not available (S600, S602). This additional capability provides further flexibility in correcting or supplementing the collected field data and ensures that the final data set is accurate and complete prior to final storage or further processing.

In one embodiment, the system further comprises a module configured to adapt the dynamically generated data entry prompts based on the specific requirements of clients and projects. In this embodiment, the field data collection system evaluates predefined criteria associated with the client's operational parameters and the project's distinct data collection needs, modifying the interactive prompts to ensure that the data entry process is tailored to the particular context of use. For example, the system is designed to incorporate client-specific guidelines or project-specific test configurations to determine the optimal set and order of data entry prompts, thereby enhancing the accuracy and relevance of the collected data. The dynamic adaptation is achieved by retrieving and processing metadata related to client requirements and project specifications, followed by adjusting the algorithm that manages prompt generation in real time.

In addition, the system includes a graphical user interface generator configured to create a user interface that displays the list of work orders, available tests, and populated data fields. The generated interface provides users with a consolidated view of relevant field work information. In one embodiment, the interface displays a list of work orders retrieved based on the selected date and other criteria, an array of available tests that are associated with different sample collection modalities, and data fields that have been populated with text converted from voice responses or other input modalities. The user interface is designed to facilitate quick review and validation of entered data, offering features such as scrollable lists, selectable options for detailed work order information, and editable fields for correcting or confirming populated data. This real-time display of work orders, test options, and existing data entries streamlines the process of correlating field activities with documentation requirements and enhances the overall efficiency of data synchronization with central databases.

These integrated functionalities of adapting data entry prompts and generating a comprehensive user interface contribute to an enhanced operational experience by ensuring that the data collection process is responsive to varying client and project demands while maintaining consistency and accuracy in the recorded field data.

In another implementation, a method for automating record-keeping in field data collection, inspection, and construction materials testing comprises integrating a field artificial intelligence (AI) Field Assistant into an application system that prompts users to initiate and complete data entry tasks. In one embodiment, the field AI Field Assistant incorporates a voice recognition module that receives verbal command from technicians and inspectors, guiding them through a series of steps required for accurate record-keeping. As users engage with the system, spoken commands trigger the initiation of data entry sequences related to sample tests and daily reports. The system is designed to recognize these spoken inputs, verify their accuracy through contextual analysis, and provide clear prompts for subsequent activities.

The system dynamically guides the technician or inspector through a structured series of steps, including the selection of a job date through spoken input or a user interface, confirmation of a specific work order, entry of test configurations, and completion of detailed report sections. Each step is presented in sequence, ensuring that the user provides all necessary information in an order that aligns with standardized procedures for construction materials testing and inspection workflows. The voice recognition engine is designed to accommodate variations in accent and speech patterns while minimizing the possibility of misinterpretation, thereby improving the accuracy and consistency of the data being recorded.

Recorded information is temporarily saved on the field device in a secure, encrypted format before being synchronized with a central web application. The system is designed to either immediately upload data upon verification of network connectivity or defer synchronization until a stable connection is available. This dual synchronization approach ensures that data collection continues uninterrupted in remote environments or areas with intermittent connectivity while still maintaining data integrity. The secure storage mechanism encompasses both local storage on the device and subsequent transfer to the secure central server, thereby protecting sensitive information from unauthorized access or data loss.

In addition, the AI Field Assistant is capable of dynamically modifying the sequence of prompts based on real-time analysis of the input data. For instance, if a specific test configuration is selected or if environmental parameters deviate from predefined standards, the Field Assistant introduces additional instructions or queries to ensure that all relevant variables are addressed. This adaptive guidance helps reduce errors that otherwise arise from manual data entry and ensures that the final inspection report is comprehensive and accurate. Control logic within the application system continuously monitors user interaction, confirming each completed step through both voice feedback and visual cues, and prompts for clarification or correction if inconsistencies are detected.

Integration between the field device and the central web application is achieved using secure transmission protocols. The system supports a range of hardware devices, including handheld devices equipped with voice recognition capabilities, ensuring that the method can be applied in diverse field environments. By automating the record-keeping process, the method not only streamlines workflow procedures but also enhances data reliability and operational efficiency in complex construction materials testing and inspection scenarios.

Figure 8:
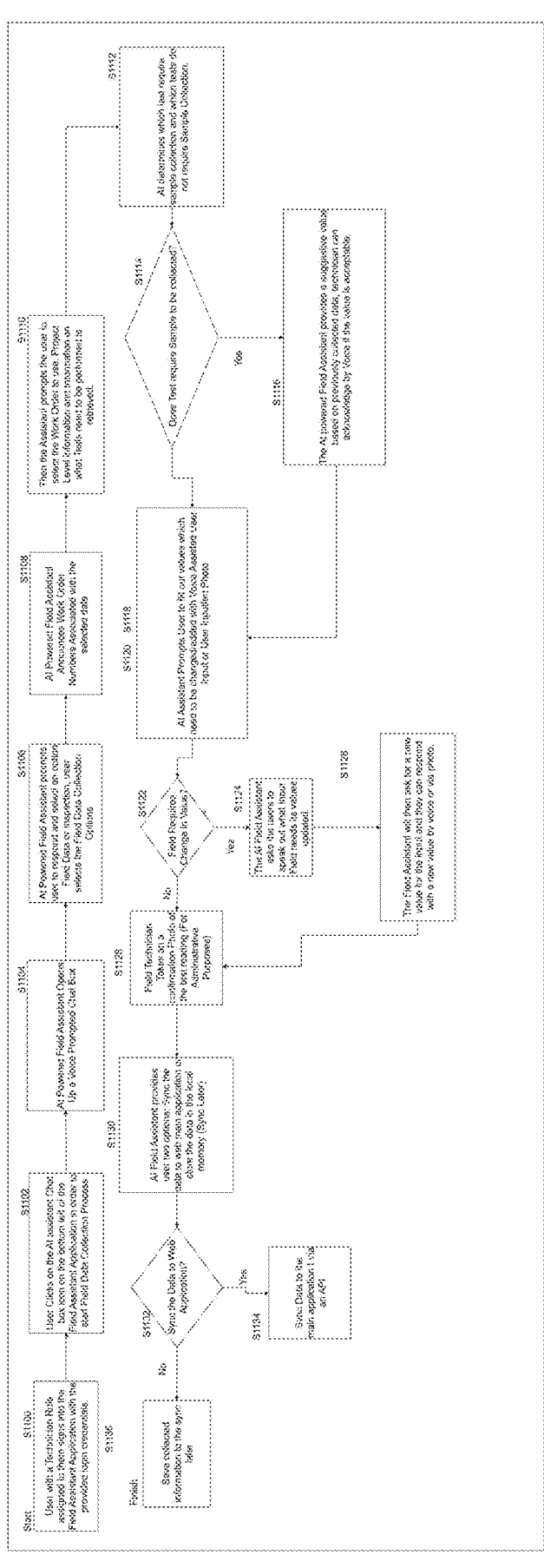
FIG. 8 shows a flowchart of an exemplary method for automating record-keeping in construction materials testing and inspection workflows.
Figure 9:
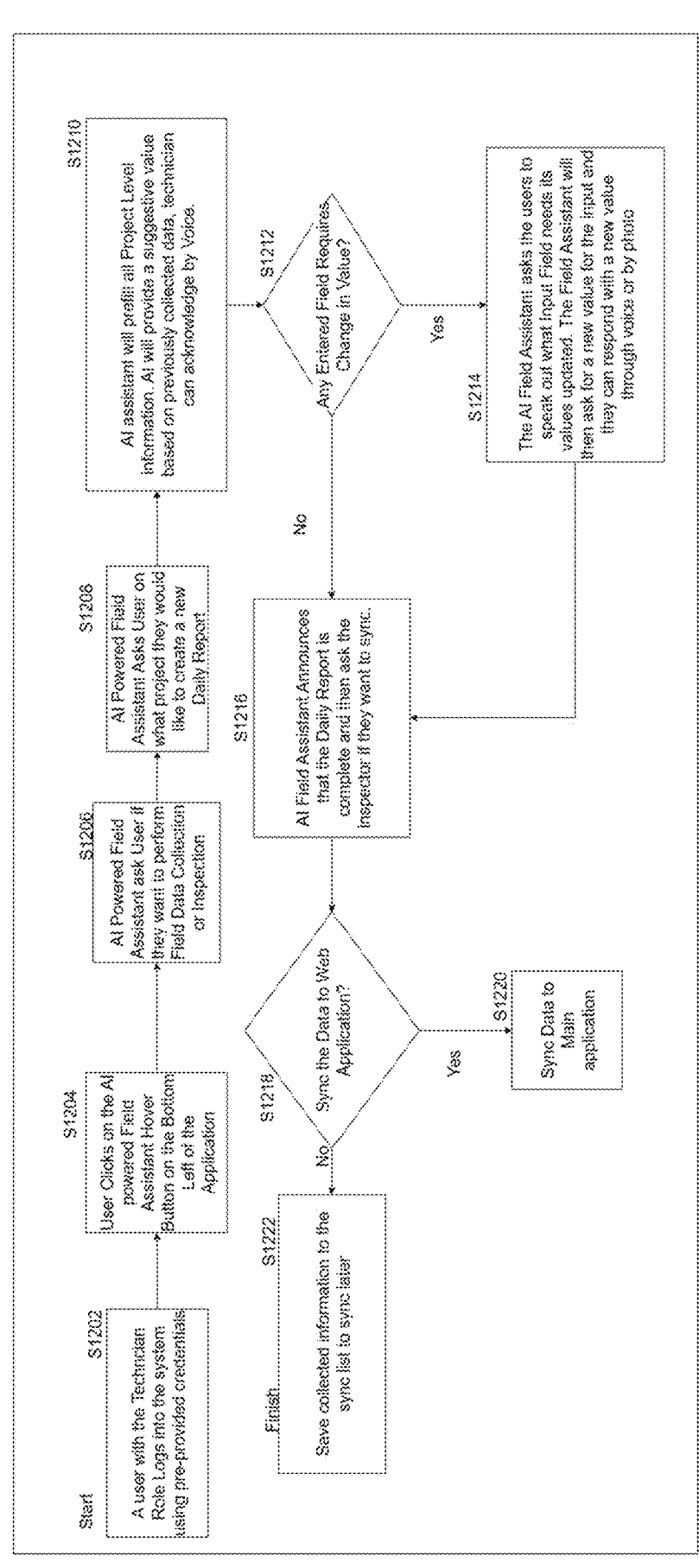
FIG. 9 shows another exemplary flowchart diagram detailing the steps for voice-activated data entry and synchronization in a record-keeping system.

FIG. 8 illustrates one embodiment involving a Field Technician with a Field Assistant, while FIG. 9 illustrates the operation of a Field Inspector with a Field Assistant. The process of FIG. 8 is as follows:

Log In: In FIG. 1, the process begins with the technician logging into the system (S1100).

Clicks on Field Assistant Option on the Home Screen: The next step involves selecting the Field Assistant option from the home screen (S1102).

Field Assistant prompts user to select Technician Role: The Field Assistant requests the user to choose their technician role (S1104).

Date selection: Field Assistant prompts users to state date they want to view Work Orders (S1106).

Work Order Announcement: The Field Assistant Announces Work Order Numbers associated with the selected date (S1108).

Work Order Selection: The Field Assistant selects which work order they want to work on (S1110).

Test Selection: The Field Assistant prompts the technician to state the test they are working on (S1112).

Sample Requirement: The process checks if the test requires one or more samples (S1114) and if so the Field Assistant prompts the user to complete the sample fields by speaking out the field names, and as the technician dictates the answer, the process records the voice dictation (S1116). From S1116 or S1114, the Field Assistant prompts the technician to fill out the test fields by speaking the field names, and the process records the answer A method for verifying sample testing and recording test values using photo verification, wherein after a sample is taken and test values are recorded, an image of the sample and test equipment is captured to serve two primary purposes. First, the captured image acts as verification that the test was conducted and that the recorded values correspond to the sample tested. Second, the image serves as an alternative method for data collection by utilizing image recognition technology to extract and validate test values from the recorded reading. The method further includes storing the test data along with the captured image in association with the sample record for future validation and analysis while also providing a mechanism to cross-verify the manually entered test values with those extracted via image recognition to ensure data accuracy and integrity. (S1118).

Fields Require Change?: This decision point asks if any fields need modification (S1120). If so, the technician speaks out the field they want to change and the value they want to change to and then confirms the changes: The technician vocalizes the field to update and confirms the changes (S1122). From S1120 or S1122, the Field Assistant prompts user to fill out test fields by speaking out the field names, when Technician answers the answer is recorded: The Field Assistant guides the user to fill test fields by vocalizing field names, and records responses (S1124).

A method for verifying testing and recording test values using photo verification, wherein after a sample is taken and test values are recorded, an image of the sample and test equipment is captured to serve two primary purposes. First, the captured image acts as verification that the test was conducted and that the recorded values correspond to the sample tested. Second, the image serves as an alternative method for data collection by utilizing image recognition technology to extract and validate test values from the recorded reading. The method further includes storing the test data along with the captured image in association with the sample record for future validation and analysis while also providing a mechanism to cross-verify the manually entered test values with those extracted via image recognition to ensure data accuracy and integrity. [S1128]

Field Field Assistant asks if data is to be synced now or Later: The Field Assistant inquires whether to sync data immediately or at a later time (S1130).

Sync Now?: A decision point where synchronization timing is confirmed (S1132). If syncing later is chosen, data is added to a list for future synchronization (S1134). Alternatively, if syncing now is chosen, data is synchronized with the main application immediately (S1136).

FIG. 9 illustrates a flowchart diagram detailing the process for voice-activated data entry and synchronization in a record-keeping system. This process begins with an inspector logging in and navigating to the field Field Assistant option on the home screen. The field inspector is then prompted to create a new daily report. The Field Assistant guides the user through inspection fields by having them speak out the field names, subsequently recording the answers. The process of FIG. 9 is as follows:

Inspector Logs In: The process begins with the inspector logging into the system (S1202).

Clicks on Field Field Assistant Option on the Home Screen: The inspector selects the "Field Field Assistant" option from the home screen (S1204).

Selects Field Inspector Field Assistant: The inspector chooses the field inspector Field Assistant tool (S1206).

Field Inspector Prompts User to 'Create a new Daily Report': The system prompts the inspector to create a new daily report (S1208).

Field Assistant prompts user to fill out inspection fields by speaking out the field names of various sections of a report. When inspector answers, the answer is recorded: The Field Assistant guides the user through filling out inspection fields by naming sections, and records the user's spoken inputs (S1210).

Fields Require Change?: The process determines if any fields require changes (S1212). If so, Inspector speaks out the field they want to change and the value they want to change to, they confirm changes: If changes are needed, the inspector vocally specifies which field and what value should be adjusted, then confirms the changes (S1214). If no changes are needed, the field Assistant inquires whether data synchronization should occur immediately or at a later time (S1216).

Field Field Assistant asks data is to be synced now or later: The query about immediate or deferred synchronization occurs (S1218). If immediate synchronization is chosen, data is synced to the main application (S1220) and if deferred synchronization is selected, data is added to a list for future syncing (S1222).

If any fields require changes, the inspector can vocalize these adjustments and confirm them. The system then determines if data synchronization should occur immediately or be deferred. If synchronization is to be done later, data is added to a sync list. Otherwise, data is synced directly to the main application.

AI integration with field applications leverages artificial intelligence to boost both the efficiency and accuracy of tasks performed in diverse field environments. This technology centers on automating data entry and streamlining workflows for technicians and inspectors through the use of voice recognition. By capturing and processing user inputs with AI, these applications are able to reduce manual errors and shorten the time needed for documentation. The system adjusts dynamically, offering seamless transitions between tasks and providing customizable templates that cater to varying project requirements. As a result, users benefit from robust data integrity, secure access, and a more user-friendly interface that supports productivity and enhances client satisfaction.

The voice recognition setup process begins when the Field AI Field Assistant prompts the user to complete a voice registration. During this initial setup, the system captures and securely stores the user's voice, ensuring that only authorized voices are recognized during field operations. This personalized voice registration helps maintain data integrity and prevents unauthorized access to the system.

The streamlined workflow for technicians encompasses several steps facilitated by the Field AI Field Assistant. When launching the application, the technician is prompted to select the job date by entering it in a "Date, Month, Year" format. Next, the technician chooses a work order from a displayed list that provides details such as the work order number, project name, and location. Once the work order is confirmed, the Field Assistant asks which test the technician intends to perform by offering a selection of available options.

During field data entry, the Field Assistant requests the specific information required for the chosen test. For example, if the test involves determining the moisture content of a sample, the technician provides a specific value that the Field Assistant records. After all required fields are completed, the Field Assistant displays the collected data for confirmation and allows corrections if necessary. Finally, it presents options for synchronizing the data immediately or at a later time, either via a web application or through local storage.

Automated data entry prompts are designed to assist technicians by dynamically guiding them through the data entry process. The system asks specific questions relevant to the task at hand and records the responses directly into the designated fields, thereby eliminating the need for manual input and reducing errors.

The Field AI Field Assistant maintains data accuracy by displaying the recorded information for user verification. The system inquires whether the technician or inspector deems the values correct. If corrections are required, the user can indicate and update the field with the accurate information. After confirmation, the Field Assistant provides options to either immediately synchronize the data with a central web application or store it locally, enabling the user to schedule synchronization at a convenient time, especially under conditions of restricted connectivity.

The streamlined workflow for inspectors begins with initiating a new daily report by stating, "Create a new Daily Report." That command takes the system directly to the Inspector Daily Report screen. As inspectors work through their reports, the AI Field Assistant supports them with step-by-step guidance, prompting for information based on predefined configurations. For example, the Field Assistant prompts for weather conditions; the inspector provides the relevant response, and the system records the input. If corrections are needed, inspectors can issue a command specifying the field and the updated value, which the Field Assistant then processes. Once all sections are complete, inspectors finalize their reports by saying "Done" or "Completed." Additionally, the Field Assistant provides options to either sync data immediately or save it for later, following the workflow established for technicians.

The "Section-by-section guidance" feature of the Field AI Field Assistant directs inspectors in generating detailed reports by prompting them for information in each predefined section. For example, the Field Assistant inquires into various conditions or observations, such as weather conditions and site details. The inspector provides the necessary information, and the Field Assistant records this response accurately in the relevant field of the report. This step-by-step approach ensures that every required detail is captured systematically and supports consistency and comprehensiveness across different reports.

The technical implementation of the Field AI Field Assistant involves both cloud and offline capabilities to ensure flexibility and reliability in various field conditions. The AI-powered voice recognition engine utilizes machine learning algorithms to accurately process user commands, even in noisy environments. This system is integrated with cloud technology, allowing data to be securely synced with a central web application. This ensures seamless access for project managers and supervisors, facilitating efficient oversight and management.

FIG. 2 thus details the steps for voice-activated data entry and synchronization in a record-keeping system. The process begins with the inspector logging in and clicking on the Field Field Assistant option on the home screen. It proceeds through field inspection and data recording, allowing changes to be made and confirmed via voice commands. The system then offers options to sync data immediately or add it to a list for later synchronization. This diagram highlights the seamless integration of voice commands in managing and updating records efficiently. Furthermore, the Field Assistant supports local storage capability, enabling offline functionality. This means that field operations can continue uninterrupted even when connectivity is poor. The AI Field Assistant stores data locally when offline and syncs it with the cloud once a connection is available. This dynamic configuration allows the system to adapt to different test and report templates based on specific client and project requirements, ensuring optimal performance across diverse scenarios.

One design integrates Artificial Intelligence (AI) with a field application system to streamline field sample pickup, testing, and inspection record-keeping. This system features a unique Field AI Field Assistant that automates data entry and improves workflow efficiency through voice recognition technology. By eliminating the need for handwritten notes, the solution enhances accuracy, reduces errors, and increases productivity for field technicians and inspectors.

Features of the Field AI Field Assistant:

Voice Recognition Setup:

During the initial setup, the Field AI Field Assistant prompts the user to complete a voice registration process.

This process captures the user's voice and stores it securely, ensuring that only authorized voices are recognized during field operations.

Streamlined Workflow for Technicians:

Job Date Selection: When the technician opens the app, the Field Assistant asks, "What date do you want to view jobs for?" The technician provides the date in the format "Date, Month, Year," which the Field Assistant records.

Work Order Selection: The Field Assistant queries, "Which Work Order do you want to work on?" A list of work orders (including Work Order Number, Project Name, and Location) is displayed. The technician provides the relevant Work Order Number.

Test Selection: Once the work order is confirmed, the Field Assistant asks, "What test would you like to perform?" The technician selects a test from a list of available options.

Field Data Entry: Depending on the selected test configuration, the Field Assistant dynamically prompts the technician with specific fields required for the test or sample. For example:

Prompt: "What is the moisture content of the sample?"

Technician's Response: "12.5 percent."

The Field Assistant records this value in the corresponding field.

Confirmation: Once all fields are populated, the Field Assistant displays the recorded data and asks the technician to confirm: "Do these values look correct?" If corrections are needed, the technician can specify the field and provide the updated value.

Sync Options: The Field Assistant concludes by asking, "Would you like to sync the data now or later?" Data can either be synced immediately to the web application or stored locally for manual syncing at a later time.

Streamlined Workflow for Inspectors:

Daily Report Creation: Inspectors can initiate a new report by saying, "Create a new Daily Report." The system then navigates to the Inspector Daily Report screen.

Section-by-Section Guidance: The Field Assistant prompts the inspector to complete each section of the report based on predefined configurations. For example:

Prompt: "What was the weather condition today?"

Inspector's Response: "Partly cloudy."

The Field Assistant records the response in the corresponding field.

Editable Fields: If corrections are required, the inspector can specify the field name and provide the updated value. For example:

Command: "Change the weather condition to sunny."

The Field Assistant updates the field accordingly.

Report Finalization: Once all fields are completed, the inspector can finalize the report by saying, "Done" or "Completed."

Sync Options: The Field Assistant provides sync options similar to those available to technicians.

Key Advantages:

Improved Accuracy: Voice recognition minimizes errors associated with handwritten records and manual data entry.

Enhanced Efficiency: Automation reduces the time required for technicians and inspectors to complete documentation.

User-Friendly Interface: The conversational AI interface ensures ease of use, even for individuals with minimal technical expertise.

Secure and Personalized: Voice registration ensures data integrity and prevents unauthorized access.

Flexibility: The option to sync data immediately or later accommodates various field conditions and connectivity constraints.

Technical Implementation

AI-Powered Voice Recognition Engine: Utilizes machine learning algorithms to recognize and process user commands accurately, even in noisy field environments.

Cloud Integration: Syncs data securely with a central web application, enabling seamless access for project managers and supervisors.

Local Storage Capability: Allows offline functionality, ensuring that field operations are not disrupted by poor connectivity.

Dynamic Configuration: Adapts to different test and report templates based on the specific requirements of clients and projects.

Use Case Example

Scenario for a Technician:

The technician logs into the Field App and is prompted: "What date do you want to view jobs for?" The technician responds, "Dec. 18, 2024."

The Field Assistant displays available work orders for the selected date and asks, "Which Work Order do you want to work on?" The technician responds, "Work Order 456."

The Field Assistant queries, "What test would you like to perform?" The technician selects "Moisture Content Test."

The Field Assistant prompt for specific data fields, records the technician's responses, and confirms the values before syncing the data.

Scenario for an Inspector:

The inspector initiates a new daily report by saying, "Create a new Daily Report."

The Field Assistant guides the inspector through each section of the report, recording details such as weather conditions, site observations, and incidents.

Upon completion, the inspector reviews and finalizes the report, choosing to sync it immediately or save it for later.

In one embodiment, the field AI Field Assistant is configured to capture a user's voice during an initial setup process. This voice capturing step is performed by a microphone integrated into the system, which records the user's voice under controlled conditions to ensure that the input is of sufficient quality for accurate analysis. The recorded voice is then subjected to a series of processing steps, including noise reduction, filtering, and normalization, to isolate the relevant audio features. These features are used to generate a distinct voiceprint that uniquely represents the authorized user's vocal characteristics.

The generated voiceprint is stored in a secure memory location and used as a biometric credential for future authentication. During subsequent interactions, the voice recognition module compares incoming voice data with the stored voiceprint to verify the user's identity. Access to the field AI Field Assistant is granted only when the comparison yields a match that exceeds a predefined similarity threshold, ensuring that only authorized personnel interact with the system. In some embodiments, the voiceprint is combined with additional identifying information to further enhance security measures.

In one embodiment, the step of work order selection involves displaying a list of available work orders based on a user-provided date and then accepting user inputs for selecting the relevant work order number. For example, a computing device determines, from a database, a plurality of work orders associated with the user-provided date and presents these work orders on a graphical user interface. The interface includes various details associated with each work order, such as a work description, assigned personnel, location information, and other metadata that assist the user in making an informed selection. In addition, the computing device incorporates filtering and sorting mechanisms so that the list is dynamically updated according to any changes in the user-provided date or other selection criteria. Once the available work orders are displayed, a user reviews the list and selects one or more work order numbers relevant to the task at hand. The selection mechanism involves the acceptance of user input through one or more input devices, with the input processed and validated by the computing device to ensure that the selected work order number corresponds to one of the displayed options. In certain embodiments, the system further validates the user selection using predetermined criteria, and if the input does not match an available work order, the system generates an error message prompting re-entry of the work order number. Moreover, the step of work order selection implements an iterative process in which the display of available work orders is refreshed in real time, ensuring that the user is consistently provided with up-to-date information. This process integrates real-time data analytics, adjusting the list of available work orders based on operational conditions and predefined parameters and ensuring that the most current and relevant data is provided to the user.

The field data entry module is configured to prompt the technician through a series of specific fields that are required for properly configuring the test. In one embodiment, the system displays a sequential series of prompts that require the technician to provide precise information corresponding to each test parameter. The technician's responses are directly recorded into a database where each entry is correlated with a predefined test configuration field. By employing this method, one implementation ensures that all necessary parameters such as identification codes, operational settings, calibration values, and environmental conditions are captured accurately and stored in a manner that facilitates subsequent validation and analysis.

In another embodiment, the system dynamically adjusts the sequence of prompts based on prior responses, ensuring that dependencies between test parameters are fully accounted for. For example, if an entry for a specific operational parameter diverges from typical values, subsequent prompts incorporate additional verifications or require supplemental information to confirm the intended setting. This adaptive prompting enhances the reliability of the recorded data while reducing the risk of errors associated with manual entry. Furthermore, each response entered by the technician is automatically mapped to its corresponding data field within the system's internal framework, facilitating seamless integration with downstream processes including data analytics, system diagnostics, or remote monitoring.

Additionally, the system incorporates error detection algorithms that compare the technician's input against predefined parameter thresholds or expected ranges. In instances where an input deviates from acceptable values, the system generates an immediate alert, prompting the technician to review and, if necessary, correct the information. This real-time feedback loop helps maintain data integrity and ensures that the test configuration aligns with required specifications from the outset. Such an integrated approach to data entry and validation enhances overall system performance and reliability during the test configuration process.

Moreover, by directly recording the technician's input into correlated entries, one implementation simplifies subsequent procedures including quality assurance checks, audit trails, and system performance analyses. The explicit correlation between the technician's responses and the respective test parameters enables a comprehensive review of the configuration process after completion. This direct method of data association removes the ambiguity that can result from manual transcription or non-correlated data logging methods, thereby reducing the potential for errors and improving the efficiency of both test execution and subsequent data review operations.

In one embodiment, confirmation involves presenting all recorded data back to the technician via a display interface configured to show individual field entries and associated values, thereby enabling the technician to review the data in a comprehensive manner. The technician is afforded the opportunity to verify the accuracy of the displayed data and to identify any discrepancies that might have occurred during the recording process. If any errors are detected, the technician can specify the particular field names that require correction along with the corresponding updated values. The system then accepts these corrections, reassigning the values to the respective fields and updating the overall data record. This process occurs prior to finalizing the entries, ensuring that the data is both complete and accurate before it is permanently recorded or further processed.

In certain embodiments, an inspector initiates creation of a daily report through a voice command interpreted by an integrated speech recognition module. The system detects predetermined verbal cues and, upon recognition, automatically launches a new report instance while concurrently navigating the user to a specific, pre-configured section designated for daily reporting. The pre-configured report section includes fields optimized for capturing relevant data, such as timestamps, annotations, and confirmation inputs, thereby streamlining the data entry process for the inspector. The navigation mechanism employs software routines that detect the voice command input and validate it against a set of predefined criteria to ensure that the correct report template is displayed. This process minimizes the need for manual intervention during report initiation and reduces the potential for user error by eliminating extraneous steps required for accessing the report interface. In certain embodiments, the voice command interface further enhances functionality by incorporating context-aware features that adjust the selection of the pre-configured report section based on factors such as the time of day, the inspector's location, or the nature of prior reports generated within the application. Additionally, error detection and feedback features are integrated into the system so that any misinterpretation or failure to recognize the voice command is communicated to the inspector via auditory or visual prompts, ensuring that the daily report creation process is carried out accurately and efficiently. This integration of voice-activated report creation with automated navigation improves workflow efficiency by enabling inspectors to quickly and reliably generate and document daily reports without engaging in multiple manual steps.

In one embodiment, the system is configured to further comprise syncing options wherein the Field Assistant queries users to determine whether they wish to sync data immediately with a web application or store it locally for later synchronization. The Field Assistant presents the user with a prompt that offers the option to perform an immediate synchronization by transmitting the data over one or more communication links to a remote server, or alternatively, to retain the data within a local storage medium until a later point when conditions are more favorable for a successful synchronization. Based on the user's selection, the system then activates one of its corresponding data handling routines. For example, if the user opts for immediate synchronization, the system verifies the integrity and security of the connection prior to transmitting the data in real-time to the web application, thereby ensuring that the data remains accurate and up-to-date across platforms. In contrast, if the user selects the local storage option, the system safely archives the data within a designated local storage space, such as a local database or file system, and schedules or awaits a subsequent user command to initiate synchronization with the web application.

This arrangement provides enhanced flexibility and user control in data management by enabling the Field Assistant to engage in decision-based querying during every vital data operation. The configurable syncing options bridge the gap between the convenience of real-time data transfer and the reliability of local storage, thereby accommodating a broad spectrum of operational use cases and network environments. The integration of these syncing options within the overall system architecture ensures that users can seamlessly transition between immediate and deferred data synchronization, making the process both robust and adaptable to varying conditions without compromising data security or integrity.

One implementation addresses challenges related to handwriting errors and inefficiencies in the construction materials testing field. Field technicians record data manually while concurrently handling tasks such as managing soil samples, making the process both time-consuming and prone to mistakes. Handwritten entries produced under time constraints and stress often become illegible, leading to confusion for project managers and supervisors. These errors result in inaccurate data entry, which in turn compromises test accuracy and sample analyses. Inaccuracies of this nature affect service quality and lead to client dissatisfaction. The solution eliminates handwritten notes and enhances accuracy and productivity by employing automated data entry via a voice-activated AI Field Assistant.

The invention claimed is:

1. A method for capturing field data, comprising:
collecting a field sample test from at least one of: a testing machine, a photograph and an artificial intelligence (AI) generated output;
scrubbing the collected field data using an AI scrubbing module and confirming, via human voice input, a selection of the AI-scrubbed data to generate a validated data set;
providing the validated data set to a field AI Field Assistant to prompt users to complete data entry tasks related to sample tests and daily reports;
dynamically guiding a technician or an inspector through specified steps including job date selection, work order confirmation, test configurations, and report sections;
recording and storing user-provided data securely, enabling immediate or deferred synchronization with a central web application.

2. The method of claim 1, wherein collecting the field sample test comprises directly receiving sensor measurements from the testing machine.

3. The method of claim 2, wherein the testing machine comprises at least one of a mechanical tester, electrical tester, optical tester, or chemical analyzer.

4. The method of claim 1, wherein collecting raw data comprises extracting image-based information directly from the photograph.

5. The method of claim 4, wherein extracting image-based information includes utilizing optical character recognition (OCR) or utilizing image recognition algorithms to identify relevant features within the photograph.

6. The method of claim 1, wherein collecting raw data comprises directly receiving data output generated entirely by an AI model without human intervention and wherein the AI model is trained on historical datasets relevant to the validated data set being generated.

7. The method of claim 1, wherein scrubbing the collected raw data comprises removing anomalies or outliers identified by the AI scrubbing module and applying machine learning algorithms trained on historical anomaly patterns.

8. The method of claim 1, wherein scrubbing the collected raw data further comprises normalizing or standardizing the format of the collected raw data using AI-driven normalization techniques.

9. The method of claim 1, further comprising
storing the validated data set in a database accessible by authorized users or systems;
associating metadata with the validated data set indicating source type and confirmation details, wherein metadata includes timestamps indicating when each step of collection, scrubbing, and confirmation occurred.

10. The method of claim 1, further comprising generating an audit trail documenting each step performed during collection, AI scrubbing, and human voice confirmation processes and wherein generating an audit trail includes storing digital records identifying individuals responsible for human voice confirmation and timestamps associated with each action taken during validation steps.

11. The method of claim 1, further comprising the step of capturing a user's voice during an initial setup process to ensure that only authorized personnel can interact with the field AI Field Assistant.

12. The method of claim 1, wherein the step of work order selection includes displaying available work orders based on a user-provided date and accepting user inputs for selecting the relevant work order number.

13. The method of claim 1, wherein field data entry prompts a user through specific fields required for the test configuration, recording user responses directly into correlated entries.

14. The method of claim 1, wherein daily report creation allows a user to start new report via voice command while providing navigation to a pre-configured report section within the application system.

15. The method of claim 1, wherein confirmation includes presenting recorded data back to the technician for verification and allowing corrections by specifying field names and updated values before finalizing entries.

16. The method of claim 1, further comprising:
receiving a voice input from a user;
authenticating the user based on the voice input;
prompting the user to select a date for viewing job information;
presenting a list of work orders for the selected date;
receiving a selection of a work order from the user;
prompting the user to select a test to perform;
dynamically generating data entry prompts based on the selected test;
receiving voice responses to the data entry prompts;
converting the voice responses into text data;
populating corresponding data fields with the text data;
displaying the populated data fields for user confirmation;
receiving a sync command from the user;
synchronizing the populated data fields with a central database.

17. A method for managing construction materials testing and inspection workflows using a field AI Field Assistant, comprising:
collecting a field sample test from at least one of: a testing machine, a photograph and an artificial intelligence (AI) generated output;
scrubbing the collected field data using an AI scrubbing module and confirming, via human voice input, a selection of the AI-scrubbed data to generate a validated data set;
providing the validated data set to a field AI Field Assistant to prompt a user to complete data entry tasks related to sample tests and daily reports;

authenticating the user based on the voice input;
prompting the user to select a date for viewing job information;
presenting a list of work orders for the selected date;
receiving a selection of a work order from the user;
prompting the user to select a test to perform;
dynamically generating data entry prompts based on the selected test;
receiving voice responses to the data entry prompts;
converting the voice responses into text data;
populating corresponding data fields with the text data;
displaying the populated data fields for user confirmation;
receiving a sync command from the user;
synchronizing the populated data fields with a central database.

18. The method of claim 17, wherein authenticating the user comprises:
prompting the user to complete a voice registration process during initial setup;
storing the user's voice profile securely for future authentication.

19. The method of claim 17, further comprising providing an option to edit the populated data fields by voice command.

20. The method of claim 17, wherein synchronizing the populated data fields comprises:
determining whether an internet connection is available;
if an internet connection is not available, storing the populated data fields locally for later synchronization, further comprising generating a daily report for field inspectors by:
prompting the user to create a new daily report;
guiding the user through each section of the report with voice prompts;
recording voice responses for each section.

21. The method of claim 17, further comprising
adapting the dynamically generated data entry prompts based on specific requirements of clients and projects;
generating a user interface that displays the list of work orders, available tests, and populated data fields.

* * * * *